US011343078B2

(12) United States Patent
Akoob et al.

(10) Patent No.: US 11,343,078 B2
(45) Date of Patent: May 24, 2022

(54) SYSTEM AND METHOD FOR SECURE INPUT AT A REMOTE SERVICE

(71) Applicant: Entersekt International Limited, Ebene (MU)

(72) Inventors: Iftekhar Akoob, Stellenbosch (ZA); Bernard Wagner, Stellenbosch (ZA); Riaan Jacobs, Stellenbosch (ZA); Gerhard Gysbert Oosthuizen, Stellenbosch (ZA); Daniel Deetlefs Bester, Stellenbosch (ZA); Xolisa Solwandle, Stellenbosch (ZA); Petrus Johannes De Wet, Stellenbosch (ZA); Francois Archibald Nolte, Stellenbosch (ZA); Dino Dominique Rodrigues Alves, Stellenbosch (ZA); Philip Johannes Cornelis Nel, Stellenbosch (ZA)

(73) Assignee: ENTERSEKT INTERNATIONAL LIMITED, Ebene (MU)

( * ) Notice: Subject to any disclaimer, the term of this patent is extended or adjusted under 35 U.S.C. 154(b) by 175 days.

(21) Appl. No.: 16/927,186

(22) Filed: Jul. 13, 2020

(65) Prior Publication Data
US 2021/0014051 A1 Jan. 14, 2021

(30) Foreign Application Priority Data

Jul. 11, 2019 (ZA) .................................. 2019/04537

(51) Int. Cl.
G06F 21/00 (2013.01)
H04L 29/06 (2006.01)
H04L 9/08 (2006.01)
H04L 9/32 (2006.01)
H04L 9/06 (2006.01)

(52) U.S. Cl.
CPC ............ *H04L 9/0825* (2013.01); *H04L 9/065* (2013.01); *H04L 9/0643* (2013.01); *H04L 9/0863* (2013.01); *H04L 9/3228* (2013.01)

(58) Field of Classification Search
CPC ..... H04L 9/0825; H04L 9/0643; H04L 9/065; H04L 9/0863; H04L 9/3228; H04L 9/3231
See application file for complete search history.

(56) References Cited

U.S. PATENT DOCUMENTS 6,510,228 B2 1/2003 Rose
7,190,791 B2 3/2007 Boren et al.
(Continued)

FOREIGN PATENT DOCUMENTS

WO 2019/026038 A1 2/2019

*Primary Examiner* — Lisa C Lewis
(74) *Attorney, Agent, or Firm* — Osha Bergman Watanabe & Burton LLP

(57) ABSTRACT

A method and system for secure input at a remote service are provided. In a method conducted at a secure input device, a hash operation is performed on a data structure including shared data, the shared data having been obtained from a remote service via an encrypted payload. User input for secure entry at the remote service is received and encoded by performing an operation on corresponding symbols of the user input and an output of the hash operation to output an encoded message, the user input and the encoded message having the same length. The encoded message is output for entry at the remote service.

20 Claims, 5 Drawing Sheets

(56) References Cited

U.S. PATENT DOCUMENTS

| | | |
|---|---|---|
| 2002/0120838 A1 | 8/2002 | Abdulkader |
| 2011/0197056 A1 | 8/2011 | Chen |
| 2015/0222619 A1* | 8/2015 | Hughes ................. H04L 63/083 |
| | | 713/168 |
| 2018/0253234 A1* | 9/2018 | Fine ........................ G06F 3/067 |
| 2019/0289017 A1* | 9/2019 | Agarwal ................... H04L 9/12 |

* cited by examiner

SYSTEM AND METHOD FOR SECURE INPUT AT A REMOTE SERVICE

CROSS-REFERENCE(S) TO RELATED APPLICATIONS

This application claims priority from South African provisional patent application number 2019/04537 filed on 11 Jul. 2019, which is incorporated by reference herein.

FIELD OF THE INVENTION

This invention relates to a system and method for secure input at a remote service, for example, but not exclusively, for authentication of a user by a remote service by way of a passcode entry device.

BACKGROUND TO THE INVENTION

In the context of passcode-based authentication, it is industry practice to store irreversible representations of the passcodes rather than storing the passcodes in the clear. There are a variety of hash functions which are typically used to generate these irreversible representations.

Hashes of passcodes are typically long hexadecimal strings of a fixed size, e.g. "2ab96390c7dbe3439de74d0c9b0b1767", computed by means of a mathematical function. It is generally easy to compute a hash of an input, such as a passcode, and low storage and computing power is required. However, it is almost impossible to derive the passcode if only the hash value is known. Hashing is therefore known as a one-way encryption mechanism. Hash functions further reliably produce the same output for the same input.

Typically, in the case of authentication of a user by a remote service, the passcode entered by the user is hashed locally before being transmitted to the remote service, where it is compared with a stored hash for a match. The passcode is ideally never stored or transmitted in clear text.

While this approach may be suitable for online applications where the device into which the passcode is entered is connected to the remote service, implementations in an offline environment may be difficult. There are, for example, instances in which it may be desirable to require passcode entry into an offline device for subsequent transmission to and authentication by a remote service via an online device. Accordingly, there is scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a computer-implemented method conducted at a secure input device comprising: performing a hash operation on a data structure including shared data, the shared data having been obtained from a remote service via an encrypted payload; receiving user input for secure entry at the remote service; encoding the user input by performing an operation on corresponding symbols of the user input and an output of the hash operation to output an encoded message, wherein the user input and the encoded message have the same length; and, outputting the encoded message for entry at the remote service.

The user input may represent a passcode to be set at the remote service. Or, the user input may represent a registered passcode for validation by the remote service.

Outputting the encoded message may include outputting the encoded message for entry at the remote service via a communication device. Outputting the encoded message may include outputting the encoded message as a one-time password (OTP) for input into and transmission from a communication device to the remote service.

The method may include including truncating an output of the hash operation to obtain a data sequence of predefined length, the data sequence being based on the shared data, and wherein encoding the user input includes performing an operation on corresponding symbols of the user input and the data sequence to output the encoded message, and wherein the user input and the data sequence have the same length.

Further features provide for the method to include obtaining the shared data from the remote service, including decrypting the encrypted payload received from the remote service using a decryption key; for the decryption key to be a private key securely stored in the secure input device and which corresponds to a public key accessible to the remote service; and wherein the private key is associated with a biometric certificate; for the private key to be stored in a secure storage location from where it is accessible only upon presentation of an associated biometric credential; and for the biometric certificate to be uniquely associated with the secure input device. Even further features provide for encoding the user input to include passing the user input through a stream cipher algorithm so as to output an encoded message; and for the output of the hash operation or a data sequence to be used as a keystream in the stream cipher algorithm.

A further feature provides for the shared data to include a nonce for submission to the remote service.

Further features provide for obtaining the shared data from the remote service to include capturing the encrypted payload being output by the remote service via a communication device; for capturing the encrypted payload to include optically capturing a graphical code representing the encrypted payload and being displayed via the communication device.

An even further feature provides for the data structure to include a unique shared secret only known by the remote service and the secure input device.

Further features provide for the shared data to include an authentication prompt associated with a transaction; for the authentication prompt to be configured for presentation to the user for authenticating the transaction; and for the data structure to include an authentication response input from the user in response to the authentication prompt.

In accordance with an aspect of the invention there is provided a computer implemented method conducted at a remote service comprising: receiving an encoded message having been output by a secure input device, the encoded message including user input for secure entry at the remote service and being associated with shared data having been provided to the secure input device via an encrypted payload; performing a hash operation on a data structure including the shared data; decoding the encoded message to obtain the user input by performing an operation on corresponding symbols of the encoded message and the output of the hash operation to output the user input; and, validating the user input.

The method may include truncating an output of the hash operation to obtain a data sequence of predefined length, the data sequence being based on the shared data, wherein performing the operation includes performing the operation on corresponding symbols of the encoded message and the data sequence to output the user input.

The user input may represent a registered passcode, and wherein validating the user input includes validating whether the user input represents the registered passcode.

Further features provide for performing the operation to include passing the encoded message through a stream cipher algorithm so as to output the user input; and for the output of the hash operation or a data sequence to be used as a keystream in the stream cipher algorithm.

Further features provide for the encoded message to be associated with the shared data by means of a secure communication session being created between the remote service and a communication device.

An even further feature provides for the data structure to include a unique shared secret only known by the remote service and the secure input device.

In accordance with a further aspect of the invention there is provided a system including a secure input device including memory for storing computer-readable program code and a processor for executing the computer-readable program code, the secure input device comprising: a first hash performing component arranged to perform a hash operation on a data structure including shared data, the shared data having been obtained from a remote service via an encrypted payload; a user input receiving component arranged to receive user input for secure entry at the remote service; an encoding component arranged to encode the user input by performing an operation on corresponding symbols of the user input and the output of the hash operation to output an encoded message, wherein the user input and the encoded message have the same length; and, an encoded message outputting component arranged to output the encoded message for entry at the remote service.

Further features provide for the system to include the remote service; for the remote service to include memory for storing computer-readable program code and a processor for executing the computer-readable program code; and for the remote service to comprise: a receiving component arranged to receive the encoded message having been output by the secure input device, the encoded message including user input for secure entry at the remote service and being associated with the shared data having been provided to the secure input device via an encrypted payload; a second hash performing component arranged to perform a hash operation on a data structure including the shared data; a decoding component arranged to decode the encoded message to obtain the user input by performing an operation on corresponding symbols of the encoded message and an output of the hash operation to output the user input; and, a validating component arranged to validate the user input.

A further feature provides for the secure input device to be an offline input device with no communication link with the remote service.

Further features provide for the remote service to include a data accessing component arranged to access the shared data; and for the data accessing component to be configured to access shared data associated with the encoded message by means of a secure session between the remote service and a communication device.

In accordance with a further aspect of the invention there is provided a computer program product comprising a computer-readable medium having stored computer-readable program code for performing the steps of: performing a hash operation on a data structure including shared data, the shared data having been obtained from a remote service via an encrypted payload; receiving user input for secure entry at the remote service; encoding the user input by performing an operation on corresponding symbols of the user input and the output of the hash operation to output an encoded message, wherein the user input and the encoded message have the same length; and, outputting the encoded message for entry at the remote service.

In accordance with a further aspect of the invention there is provided a computer program product comprising a computer-readable medium having stored computer-readable program code for performing the steps of: receiving an encoded message having been output by a secure input device, the encoded message including user input for secure entry at the remote service and being associated with shared data having been provided to the secure input device via an encrypted payload; performing a hash operation on a data structure including the shared data; decoding the encoded message to obtain the user input by performing an operation on corresponding symbols of the encoded message and the output of the hash operation to output the user input; and, validating the user input.

Further features provide for the computer-readable medium to be a non-transitory computer-readable medium and for the computer-readable program code to be executable by a processing circuit.

In accordance with an aspect of the invention there is provided a computer-implemented method conducted at a passcode entry device comprising: performing a hash operation on a data structure including shared data and truncating the output of the hash operation to obtain a data sequence of predefined length, the data sequence being based on the shared data, the shared data having been obtained from a remote service via a first communication channel; receiving user input representing a registered user passcode; encoding the user input by performing an operation on corresponding symbols of the user input and the data sequence to output an encoded message, wherein the user input and data sequence have the same length; and, outputting the encoded message as a one-time password (OTP) for presentation to the remote service.

In accordance with an aspect of the invention there is provided a computer implemented method conducted at a remote service comprising: receiving an encoded message having been output as a one-time passcode (OTP) by a passcode entry device, the encoded message including user input representing a registered passcode and being associated with shared data having been provided to the passcode entry device via a first communication channel; performing a hash operation on a data structure including the shared data and truncating an output of the hash operation to obtain a data sequence of predefined length, the data sequence being based on the shared data; decoding the encoded message to obtain the user input by performing an operation on corresponding symbols of the encoded message and the data sequence to output the user input; and, validating whether the user input represents the registered passcode.

Embodiments of the invention will now be described, by way of example only, with reference to the accompanying drawings.

DETAILED DESCRIPTION WITH REFERENCE TO THE DRAWINGS

Figure 1A:
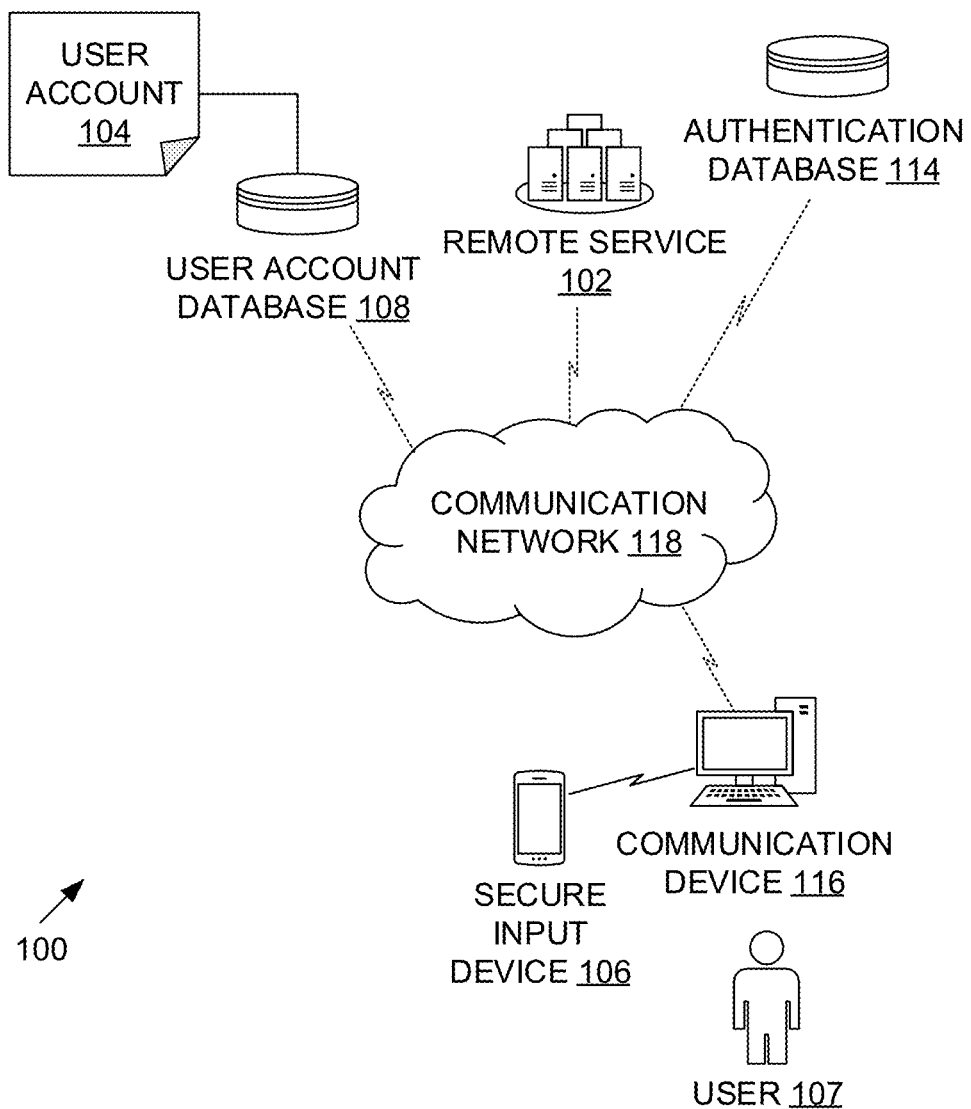
FIG. 1A is a schematic diagram which illustrates an exemplary system for secure input at a remote service including remote service authentication according to aspects of the present disclosure.

Aspects of the present disclosure relate to a system and method for secure input at a remote service. The secure input may be provided to a remote service from a secure input device via a communication device and a communication network. Some embodiments of the present disclosure relate to remote service authentication by way of a secure input device configured as a passcode entry device. Aspects of the present disclosure are more particularly directed towards remote service authentication by way of a registered passcode which is entered into a passcode entry device. In some cases, the passcode entry device may be offline in that it cannot or does not connect directly to the remote service (e.g. via an internet connection). The passcode may be said to be registered in that it has previously been associated with a username or other identifier at the remote service. Naturally, storage of the passcode at the remote service may be limited to storage of a representation of the passcode (such as a hash of the passcode). In other words, the remote service may have no permanent storage of the plaintext passcode as it would be known to or recognizable by an associated user. The passcode may be in the form of a PIN, password or the like. The passcode may be a static passcode, in that it is registered for use in multiple authentications. In some implementations, multifactor authentication may be provided.

Further aspects of the present disclosure provide for encoding of a registered passcode entered by a user into a passcode entry device and output of the encoded passcode. The passcode may be encoded using data that is shared between the remote service and the passcode entry device. The shared data may be encrypted for decryption using a key to which only the passcode entry device has access. This may ensure that only a particular passcode entry device can access the shared data. In some implementations, the shared data may include data relating to or describing the transaction that is to be authenticated. The data relating to or describing the transaction may be an authentication prompt (e.g. "Do you want to log on to xyz.com?" or "Do you want to add xyz as a payment beneficiary to your internet banking list of beneficiaries?" or the like). In some cases, the shared data may include a shared secret known only to the remote service and, upon receipt, the passcode entry device.

Encoding the passcode using the shared data may include performing an operation on corresponding symbols of user input representing the passcode and the data sequence representing the shared data to output an encoded message. In some cases, a data structure including at least a subset of the shared data may be hashed and truncated to have a length (in terms of number of symbols) that is the same as that of the user input. The data structure may also include a secret which has previously been shared with the passcode entry device and which is known to the remote service. This hashed and truncated data (which may be termed a "data sequence") may be used for performance of the operation. The operation may be a stream cipher operation. The encoded message may be output, e.g. to the user, for submission to and validation by the remote service. As the encoded message has been generated based on shared data and a registered passcode, the remote service can decode the encoded message to obtain and validate the registered passcode.

The term "remote service authentication" as used herein should be broadly construed to include any authentication of a user or transaction by a remote service. Authentication of a transaction may include authentication of a user associated with the transaction. Exemplary transactions include but are not limited to financial transactions. Transactions may for example further include generally accessing and/or using the remote service or resources offered by the remote service.

FIG. 1A is a schematic diagram which illustrates an exemplary system (100) for secure input at a remote service, which may include remote service authentication. The system (100) may include a remote service (102), a communication device (116) and a secure input device (106), which in some embodiments is configured or functions as a passcode entry device. The communication device (116) and secure input device (106) may be accessible to a user (107) of the system. The communication device (116) may be able to communicate with the remote service (102) via a suitable communication network (118), including for example the Internet.

In some implementations, the user may have an account or profile registered with the remote service (102) and may be able to utilise services provided by the remote service. The services may be utilised remotely using, e.g., the communication device (116). The remote service may for example be a cloud computing or other Internet-based service, a virtual private network or the like. In other implementations, the remote service may be an authentication service utilised by third party entities, such as banks. In such an implementation, the remote service may provide authentication services to the third-party entities to authenticate users and/or assure the third-party entities that data and messages originating from the communication device can be associated with the user.

The communication device (116) may be any suitable computing device capable of communicating with the remote service (102) via the communication network (118). The communication device (116) may for example be in the form of a mobile phone, laptop computer, desktop computer, smart appliance or the like. The communication device (116) may be accessible to the user.

The remote service (102) may be provided by one or more computing devices, such as server computers (which may be cloud-based, distributed, clustered or the like). The remote service (102) may store a user account (104) in a user account database (108). The user account may be uniquely linked to and accessible by the user and may be associated with the services of the remote service (102) which are utilised by the user.

The remote service (102) may have access to an authentication database (110) in and from which an authentication record associated with the user (or a user record) may be stored and accessed. The authentication record may store a hash value or hash code of a registered passcode which the user has registered with the remote service (102) for the purpose of authentication. The authentication record may be usable in association with the user record (e.g. to authenticate access to or other interaction with the user record by the user).

In some implementations the authentication record may store a shared secret which is known only to the authentication service and the secure input device (106) of the user. The shared secret may for example be in the form of a globally unique, randomly generated number.

The authentication record may store a device certificate and/or associated public key which is uniquely associated with the secure input device (106). The authentication record may further store a biometric certificate and/or a public key associated with the biometric certificate. The biometric certificate may have been linked to the secure input device (106) during an enrolment procedure and may be uniquely associated with the user of the secure input device (by way of a registered biometric) and with the secure input device.

The authentication record may store a device identifier of the secure input device (106). The remote service (102) may be able associate the secure input device (106) with the user.

The remote service (102) may be configured to authenticate the user. Authentication may be prior to the remote service (102) providing services to or facilitating utilisation of services by the user. In other implementations, authentication may be on behalf of a third-party entity. Authentication of the user may be via a registered passcode entered into the secure input device (106), acting in such a use case as a passcode entry device, and optionally via one or more other factors.

The functionality of the secure input device (106) may be provided by a software application executing on a suitable computing device. The software application may be under the control of the remote service (102). That is, the remote service (102) may have issued the software application, may be able to update the software application and, in some instances, may be able to block or disable the software application. The computing device may be a mobile communication device, such as a mobile phone, tablet computer, personal digital assistant, wearable computing device or the like. The secure input device (106) may thus be in the form of a mobile communication device having the software application installed thereon.

The secure input device (106) may be uniquely linked to the user (107). This link or association may have been established during an enrolment procedure which may include registering a device certificate with the remote service (102). The device certificate may be a digital certificate which is uniquely linked to the secure input device (106) and which can be used to prove ownership of data or messages originating from the secure input device. The device certificate may be associated with a corresponding public and private key pair one or both of which may be securely stored at the secure input device (106). The secure input device (106) may store and be associated with a device identifier which uniquely identifies the secure input device to the remote service (102). In some cases, the device identifier may be provided by the device certificate while in other cases the device identifier may be included in the device certificate.

The secure input device (106) may store a biometric certificate. The biometric certificate may be uniquely linked to a biometric credential of the user (107). In some implementations, the secure input device (106) may be configured to withhold access to the biometric certificate and/or associated keys until the biometric credential associated with the biometric certificate has been presented to and validated by the secure input device.

In some implementations, the biometric certificate may be uniquely linked to the secure input device (106). For example, during registration of the relevant biometric credential (e.g. fingerprint), a certificate signing request (CSR) may be generated by the secure input device (106) and digitally signed using the device certificate or associated key(s). The CSR may include the data elements required for compilation of the biometric certificate (including e.g. the biometric certificate public key) and may be transmitted to a certificate authority (CA) responsible for the compilation of the biometric certificate. The CA may be configured to validate the digital signature of the signed CSR using the device certificate and may use the previously enrolled device certificate to uniquely link the compiled biometric certificate to the secure input device (106).

The secure input device (106) may store a shared secret. The shared secret may be known only to the secure input device and the remote service (102). The secure input device may securely store the shared secret such that it is only accessible to the secure input device.

The secure input device (106) may have access to a secure element or other secure enclave in which data may be securely stored and processed. For example, one or more of the device certificate; a private key associated with the device certificate; the biometric certificate; a private key associated with the biometric certificate; the shared secret; and the device identifier may be stored in the secure element.

The secure input device (106) may be configured to receive and encode a user input representing the registered passcode for provision to and validation by the remote service (102). In some implementations or in some scenarios, the secure input device may be offline, in that it has no communication link with the remote service (e.g. it cannot or does not connect to the remote service (102) via the communication network (118)). The secure input device (106) may be configured to receive data from the remote service (102) via a secure (and optionally offline) communication channel and to use the data to generate a key for encoding the user input. The secure and optionally offline communication channel may be effected by way of a proximity communication channel provided between the communication device (116) and the secure input device (106). The proximity communication channel may be any one of an optical-, audio- or radio frequency-based communication channel and may be secured using encryption/decryption keys known only to the remote service (102) and secure input device (106).

The system (100) described above may implement a method for secure input at a remote service, which may include remote service authentication.

Figures 1B, 1C:
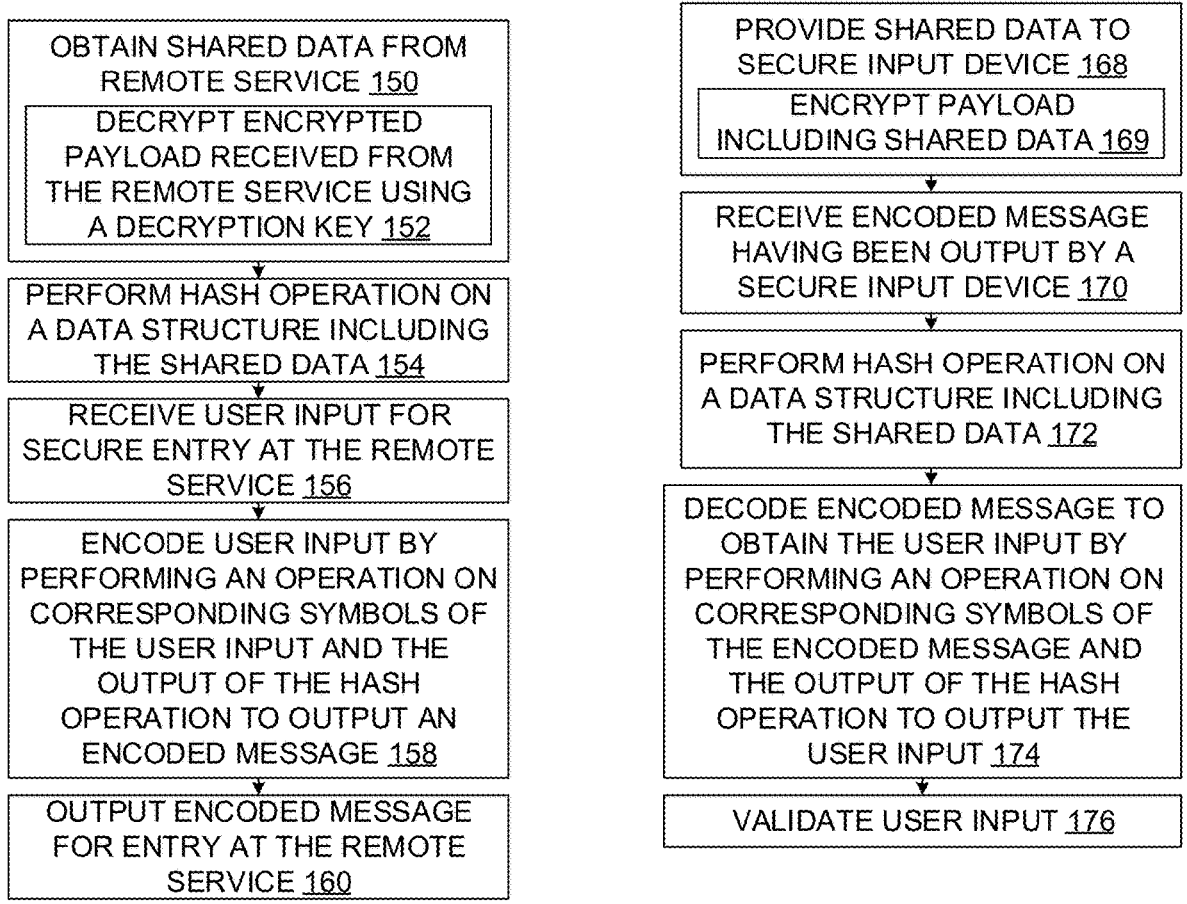
FIG. 1B is a flow diagram which illustrates an example method for secure input at a remote service, the method being conducted by a secure input device.
FIG. 1C is a flow diagram which illustrates an example method for secure input at a remote service, the method being conducted by the remote service.

An example method for secure input at a remote service is illustrated in the swim-lane flow diagram of FIG. 1B. The method may be conducted by a secure input device.

The method includes obtaining (150) shared data from the remote service, including decrypting (152) an encrypted payload received from the remote service using a decryption key which is unique to the secure input device. In some embodiments, the decryption key is a private key securely stored in the secure input device and which corresponds to a public key accessible to the remote service. In other embodiments the decryption key is a symmetric encryption/decryption key known only the secure input device and the remote service. The shared data may be obtained by the secure input device via a communication device connected to the remote service, e.g. via the communication network.

The method includes performing (154) a hash operation on a data structure including the shared data having been obtained from the remote service via the encrypted payload.

The method includes receiving (156) user input for secure entry at the remote service. In some implementations the user input represents a passcode to be set at the remote service. In other implementations, the user input represents a registered passcode for validation by the remote service.

The method includes encoding (158) the user input by performing an operation on corresponding symbols of the user input and the output of the hash operation to output an encoded message. The encoding may be a symbol-wise encoding such that the number of symbols of the output of the hash operation that are used corresponds to the length of the user input. The operation may be a stream cipher operation where the output of the hash operation is used as the keystream. A stream cipher may be a symmetric key cipher where plaintext digits (the user input) are combined with a pseudorandom cipher digit stream (the keystream). In a stream cipher, each plaintext digit is encrypted one at a time with the corresponding digit of the keystream, to give a digit of the ciphertext stream. The digit may be a bit and the combining operation may be an exclusive-or (XOR). The user input and the encoded message have the same length. Using the output of the hash operation as the keystream may improve entropy and hence security of the encoding.

The method includes outputting (160) the encoded message for entry at the remote service. In some implementations, the encoded message is output for presentation to and entry at the remote service via the computing device. In some implementations, the encoded message is output as a one-time password (OTP) which the user types or otherwise inputs into the communication device.

An example method for secure input at a remote service is illustrated in the swim-lane flow diagram of FIG. 1C. The method may be conducted by the remote service.

The method includes providing (168) shared data to a secure input device, including encrypting (169) a payload including the shared data using an encryption key which is unique to the secure input device, such as a public key associated with a private key securely stored at the secure input device or a symmetric encryption/decryption key which is known only to the secure input device and the remote service.

The method includes receiving (170) an encoded message having been output by a secure input device. The encoded message includes user input for secure entry at the remote service and is associated with shared data having been provided to the secure input device by the remote service via an encrypted payload.

The method includes performing (172) a hash operation on a data structure including the shared data.

The method includes decoding (174) the encoded message to obtain the user input by performing an operation on corresponding symbols of the encoded message and the output of the hash operation to output the user input. The decoding may correspond to the encoding performed by the secure input device, except in that the encoded message is input for decoding instead of the user input being input for encoding.

The method includes validating (176) the user input. In some implementations, the user input represents a registered passcode, and validating the user input includes validating whether the user input represents the registered passcode. In other implementations, the user input represents a new passcode for being set against a user account.

Figure 2:
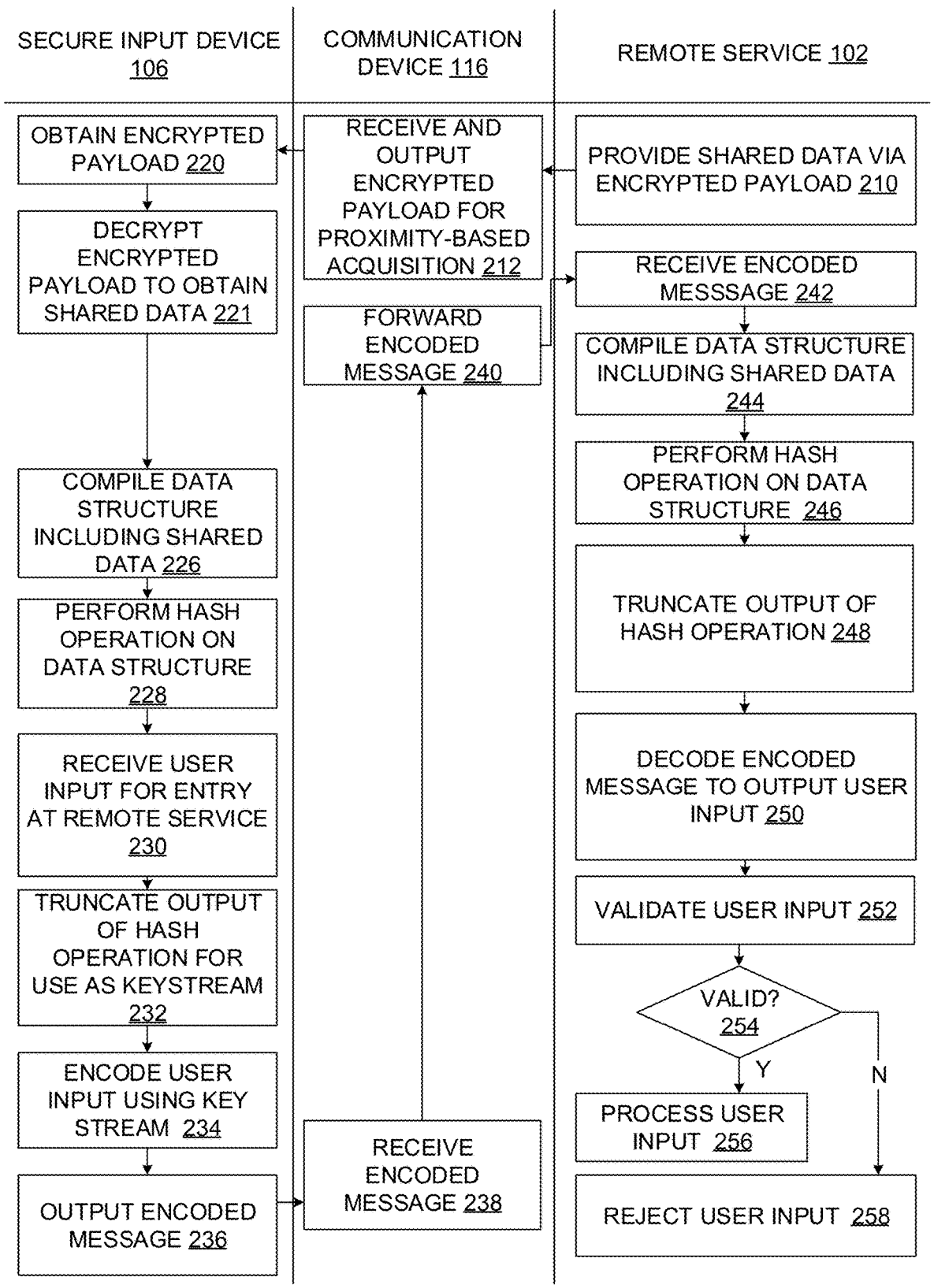
FIG. 2 is a swim-lane flow diagram which illustrates an exemplary method for secure input at a remote service including remote service authentication according to aspects of the present disclosure.

Another exemplary method for secure input at a remote service, which includes remote service authentication, is illustrated in the swim-lane flow diagram of FIG. 2, in which respective swim-lanes delineate steps, operations or procedures performed by respective entities or devices. The method of FIG. 2 is described primarily with reference to an embodiment in which the secure input is used for authentication of a user by a remote service by way of a secure input device. Aspects of the example embodiment may however find application in other use cases, for example for setting of a new passcode at the remote service by way of the secure input device or the like.

The user (107) may use the communication device (116) to establish a session with the remote service (102). The session may be a secure session by way of which the communication device (116) and remote service (102) may exchange messages and data. The session may be established for the purpose of conducting a transaction of some form, in order to establish a secure and trusted communication channel between the remote service (102) and the communication device (116) or otherwise to utilise resources of the remote service. The transaction may be a financial transaction. Complete establishment of the session may be subject to proper authentication of the user (107), which may require validation of a registered passcode and optionally one or more other factors. The registered passcode may have previously been registered with the remote service (102) and may be known to the user (107).

The remote service (102) may provide (210) shared data to a secure input device (106) via a first communication channel. The communication channel may be a secure communication channel. Providing the shared data to the secure input device (106) may be via the communication device (116) which is accessible to the user (107) associated with the secure input device. This may include the remote service transmitting the shared data to communication device via the communication network. The remote service may include the shared data in a payload and encrypt the payload such that it can only be decrypted by the secure input device (106). The remote service may for example use a public key that is associated with a private key that is securely stored in the secure input device (106). The communication device (116) receives the shared data from the remote service and outputs (214) it for proximity-based acquisition by the secure input device (106). In some implementations, the secure input device (106) may be an offline device (or may be operating in an offline mode), meaning that it cannot directly connect to the communication network (118) and thus cannot directly receive the shared data from the remote service (102). The first communication channel may extend between the remote service (102), communication device (116) and secure input device (106). Communication between the remote service and the communication device may be via the communication network while communication between the communication device and the secure input device may be via a proximity-based communication link or channel, such as radio-frequency (e.g. NFC or BLE), optical communication (e.g. by displaying a graphical code for acquisition by the secure input device), sound-based communication or other suitable proximity-based communication link. The first communication channel may be provided using one or more encrypted payloads which are passed from the remote service (102) to the communication device (116) for acquisition by the secure input device (106). It may be that only the secure input device (106) is capable of decrypting the encrypted payloads. The communication channel may thus be a secure communication channel. The encrypted payloads may be used for sharing data between the remote service and the secure input device.

In some implementations, for example, the payload may be encrypted using a public key associated with a biometric certificate which is uniquely linked to the secure input device (106). One or both of the public key and biometric certificate may be stored at the remote service (e.g. in the authentication database) and may be uniquely linked with an authentication record associated with the user.

The secure input device (106) may obtain (220) the shared data from the remote service (102) via the first communication channel. Obtaining the shared data via the first communication channel may include obtaining the shared data via the communication device (116). Obtaining the shared data may include obtaining an encrypted payload including the shared data and decrypting (221) the payload to output the shared data. This may include accessing a decryption key, such as a private key corresponding to a public key used to encrypt the encrypted payload, from a secure storage location accessible to the secure input device.

As mentioned, in some implementations, the payload may have been encrypted at the remote service (102) using a public key associated with a biometric certificate linked to the secure input device (106). Obtaining the shared data may include accessing a private key corresponding to the public key for use in decrypting the encrypted payload. The private key may be stored in a secure element or secure storage location associated with the secure input device (106). In some implementations, the private key may only be accessible subsequent to the presentation of a biometric credential which is associated with the biometric certificate. For example the user (107) may have to present a fingerprint, face or other biometric to the secure input device (106), which validates the biometric credential before the private key can be accessed and used to decrypt the encrypted payload.

The shared data may include one or more of: an authentication prompt; possible authentication responses for selection by the user; a seed value (or cryptographic nonce, salt value or the like); other plaintext data relating to the transaction, and the like. The authentication prompt may include transaction details and may be configured to cause the secure input device (106) to prompt the user (107) to authenticate the transaction as described in the transaction details. The shared data may include a degree of randomness such that it cannot be guessed or inferred by a nefarious third party. The shared data may be unique such that it cannot be replayed at a later stage by a nefarious third party. The shared data may be encrypted such that it cannot be copied by a nefarious third party. The randomness and uniqueness may be provided by the seed value or cryptographic nonce, which may be uniquely generated for each encrypted payload.

The secure input device (106) may display or otherwise output the authentication prompt to the user (107). The authentication prompt may prompt the user (107) for authentication of the transaction. In some implementations, the prompt may prompt the user (107) for an input as to a specific action to be taken in respect of the authentication prompt. For example, in the case of a financial transaction, the authentication prompt may recite "Do you want to pay USD100 to Bill Jones? If "yes", press "1". If "no", press "2". In other implementations, the authentication prompt may include graphically rendered push buttons associated with each of "yes" or "no" or any other action (e.g. "Report fraud", etc.) or the user may be required to type or otherwise input a response. Outputting the authentication prompt may thus include outputting one or more authentication responses for selection by the user. The secure input device (106) may receive an authentication response input by the user (107).

The secure input device (106) may compile (226) a data structure. The data structure may include one or more of: the shared data (or a subset or selection of the shared data such as the authentication prompt and cryptographic nonce); an authentication response input by the user; and, a unique, shared secret. The shared secret may be known only by the remote service (102) and the secure input device (106). The secure input device (106) may retrieve the shared secret from a secure element or secure storage location where it is stored. The shared secret may be uniquely associated with the secure input device (106) at the remote service (102). The shared secret may have been communicated to the secure input device (106) from the remote service (102) in a previous session or interaction (e.g. upon installation/registration of the software application). In some cases, two shared secrets are used, one being a static (or multiple-use) shared secret and the other being single-use and having been included in the shared data.

The secure input device (106) may perform (228) a hash operation on the data structure. The hash operation may output a hash value or code representing a hash of the data structure. Any suitable hash function may be used to perform the hash operation. The hash function may be suitable algorithm that maps a data structure of arbitrary size onto a hash value or hash code of a fixed size. The hash function may be selected as one which reliably produces the same output for the same input. The same hash function may be known to the secure input device (106) and the remote service (102).

The secure input device (106) may prompt the user to input information for secure transmission to the remote service, such as a passcode for setting at the remote service, an authentication response or the like. In the illustrated embodiment, the secure input device prompts the user to input a registered passcode into the secure input device. In some implementations, such a prompt may be included in the authentication prompt while in other implementations it may be a separate prompt that occurs before, after or in place of the authentication prompt. The secure input device (106) may receive (230) user input for secure entry at the remote service, which in the illustrated embodiment represents the registered user passcode but in other embodiments may for example represent a passcode to be set at the remote service for future use as a registered passcode. In some cases, the secure input device (106) may receive the user input in response to displaying some or all of the shared data to the user (107). In some cases, for example, the secure input device (106) may display an authentication prompt to the user (107), which may prompt the user for an authentication response selection and/or a registered passcode.

In the illustrated embodiment, the secure input device (106) truncates (232) the output of the hash operation in a predefined manner to provide a data sequence of a specific or predefined length. This may include truncating the hash value or hash code. The predefined manner may for example define the starting point from where the predefined length is counted (e.g. from the beginning of the data sequence, from the end of the data sequence, etc.). In some implementations, the predefined length may be based on a length of a registered passcode. In some cases, the length of the registered passcode may be set (e.g. in the case of a four- or five-digit PIN) while in other cases the predefined length may be derived from the length of the registered passcode (e.g. in the case of a password which can be of a user-selected length). In some implementations, the predefined length is derived from user input which represents the passcode. The data sequence is obtained from the hash value generated by hashing the shared data and is hence based on the shared data. As will be explained below, the data sequence may be used as a keystream in a stream cipher algorithm. In other embodiments, the truncation is not performed.

The secure input device (106) may encode (234) the user input by performing an operation on corresponding symbols of the user input and the output of the hash operation (which in the illustrated embodiment includes the data sequence) to output an encoded message. The user input and the encoded message have the same length (i.e. the same number of symbols) and the operation may be performed symbol-wise on each symbol in the sequence of symbols. In some implementations, the symbols may be bits and the operation may be a bitwise operation. In other implementations, the symbols may be characters and the operation may be a character-wise operation. In the illustrated embodiment, where the encoding uses the data sequence, the user input and data sequence have the same length and the operation is performed symbol-wise on the user input and the data sequence to output the encoded message.

In some implementations, the operation may implement a stream cipher-type operation, in which the output of the hash operation or data sequence, as the case may be, is used as the key stream. The encoding may thus be a stream cipher-based encoding of the user input in which the user input is passed through a stream cipher algorithm. Passing the user input through the stream cipher algorithm may cause a symbol-wise or bitwise operation to be performed on corresponding symbols of the user input and the keystream to output the encoded message. The operation may be a mod 2 exclusive OR operation (XOR).

The stream cipher algorithm may encode or encrypt each bit of a sequence of bits representing the user input by adding a corresponding bit (in so far as significance is concerned) from a sequence of bits representing the data sequence to output the encoded message. The addition may use modular arithmetic (i.e. modulo 2).

The encoding performed may output an encoded message having the same length as the user input.

The secure input device (106) may display or otherwise output (236) the encoded message for presentation to and entry at the remote service. In the illustrated embodiment, the encoded message is output to the user (107) for input into the remote service via the communication device. The encoded message may be output as a one-time password (OTP). In other words, the user (107) may "recognise" the output as being an OTP, whereas it is in fact a unique encoding of the user input, in this embodiment being the user's registered passcode. Thus, from the perspective of the user (107), the secure input device (106) seemingly generates and outputs an OTP, whereas a unique encoding of the registered (and static) passcode is output. In other embodiments, the encoded input may be output for transmission to and entry at the remote service via other mechanisms, for example via radio-frequency, optical or sound-based proximity transfer from the secure input device to the communication device and onwards to the remote service.

The user (107) may input the encoded message into the communication device (116) for submission to the remote service (102). In the case of the encoded message being output and displayed as an OTP, the user may type the OTP into the communication device for submission to the remote service. The communication device (116) may receive (238) and forward (240) the encoded message to the remote service (102). Forwarding the encoded message may be via the session established between the communication device (116) and the remote service (102). As mentioned, the session may be a secure session such that interception of the encoded message and other data may be prevented. The session may be associated with a session identifier for linking together different messages and/or data received via the session. In other implementations, the encoded message may be provided to the communication device via the proximity communication channel used by the communication device to transmit the shared data/encrypted payloads to the secure input device.

The remote service (102) may receive (242) the encoded message from the communication device (116). The encoded message may be received via the session established between the communication device (116) and remote service (102). As the encoded message is received in the same session via which the shared data was provided to the communication device, the encoded message may be associated with, or capable of being linked to the shared data which the remote service (102) provided to the secure input device (106).

The remote service (102) may compile (244) a data structure including one or more of: the shared data (or a subset thereof); an authentication response; and, a unique, shared secret. In the case of the data structure including an authentication response, it may be necessary to compile one data structure for each of the possible authentication responses. This may be because the authentication response is input into the secure input device (106) only and is not known the communication device and remote service. In other implementations, the authentication response may be input into the communication device (116) as well or may otherwise be communicated to the remote service (102).

Compiling the data structure may use a predefined schema or template which is used by both the secure input device and remote service.

The remote service (102) may perform (246) a hash operation on the data structure to output a hash value or hash code. The hash operation may be the same hash operation performed by the secure input device (106) on the data structure compiled by the secure input device. In the illustrated embodiment, the remote service (102) truncates (248) the output of the hash operation to obtain a data sequence of predefined length. The manner in which the output is truncated corresponds to the manner of truncating performed by the secure input device. The predefined length may be preconfigured (e.g. in the case of PIN) or derived from the length of the encoded message. In the case of multiple data structures being compiled, each of the data structures may be hashed and each of the resulting hash values may be truncated to output a plurality of data sequences. Each of the plurality of data sequences is associated with the shared data and an authentication response. In other embodiments, the truncation is not performed.

The remote service (102) may decode (250) the encoded message by performing an operation on corresponding symbols of the encoded message and the output of the hash operation or the data sequence, as the case may be, to output the user input for entry at the remote service. In the illustrated embodiment, the user input represents the registered passcode while in other embodiments the user input may represent other input for secure entry, such as a passcode to be set in association with a user account. The encoded message and the data sequence may have the same length (being the predefined length). In the case of multiple hash outputs or data sequences, the encoded message may be decoded using each of the outputs or data sequences, as the case may be, to obtain multiple strings. Only one of the strings will represent the user input, being that which was decoded using the data sequence associated with the authentication response that the user input into the secure input device (106).

Decoding the encoded message may include passing the message through a stream cipher algorithm in which the, or each, hash operation output or data sequence, as the case may be, represents a keystream. In some cases, the encode and decode operations may be the same (e.g. a mod 2 XOR operation with the keystream may be used for both encoding and decoding).

The remote service (102) may validate (252) the decoded user input. This may include determining whether the decoding was successful, whether the correct keystream was used in the encoding/decoding, whether the correct shared data was used, or the like. Validating the decoded user input may for example including performing redundancy checks or other error detection techniques, for example using a check digit and modulo 10, modulo 11 or the like.

In the illustrated embodiment, where the user input represents a registered passcode for authentication of the user at the remote service, validating (252) the decoded user input may also include determining whether or not the user input represents the registered passcode. This may include hashing the user input to output a hash value of the user input and comparing the hash value to a stored hash value of the registered passcode. In the case of multiple strings, each string may be validated as to whether or not it represents the registered passcode. Any one of the strings being validated may result in an authentication success. The valid string may be mapped to the authentication response with which it is associated to identify the authentication response input by the user into the secure input device.

If (254) the user input is validated, the remote service processes (256) the user input accordingly. If (254) the user input is not valid, the remote service may discard (258) or reject the user input. In the case of the user input representing passcode to be set against a user account, processing the user input may include setting or registering the passcode against the user account for subsequent use in authentication.

In the illustrated embodiment where the user input represents a registered passcode, if the user input is validated as representing the registered passcode, processing the user input includes the remote service (102) authenticating the user (107) and/or authorizing the transaction associated with the request. Further interaction with the remote service (102) via the communication device (116) may be permitted or an authentication success message may be transmitted to a third party having requested the authentication, as the case may be. In the case of the authentication relating to a particular transaction, the transaction may be allowed to proceed. Otherwise user authentications may fail and some or all of the operations above may have to be repeated.

The method described in the foregoing may enable secure input at a remote service using a secure input device. The method described in the forgoing may enable offline, registered passcode-based authentication. The method may find application in scenarios in which a secure input device does not have a direct connection to a communication network and hence the remote service or in cases where the secure input device does not store or otherwise have knowledge of the registered passcode. The method described in the foregoing may further inextricably link authentication of a user together with an authentication prompt. The authentication may be multifactor and may establish possession (only the secure input device knows the shared secret), inherence (only the user's biometric credential can release an encryption key for decrypting the payload) and knowledge (only the user knows the registered passcode).

Figure 3:
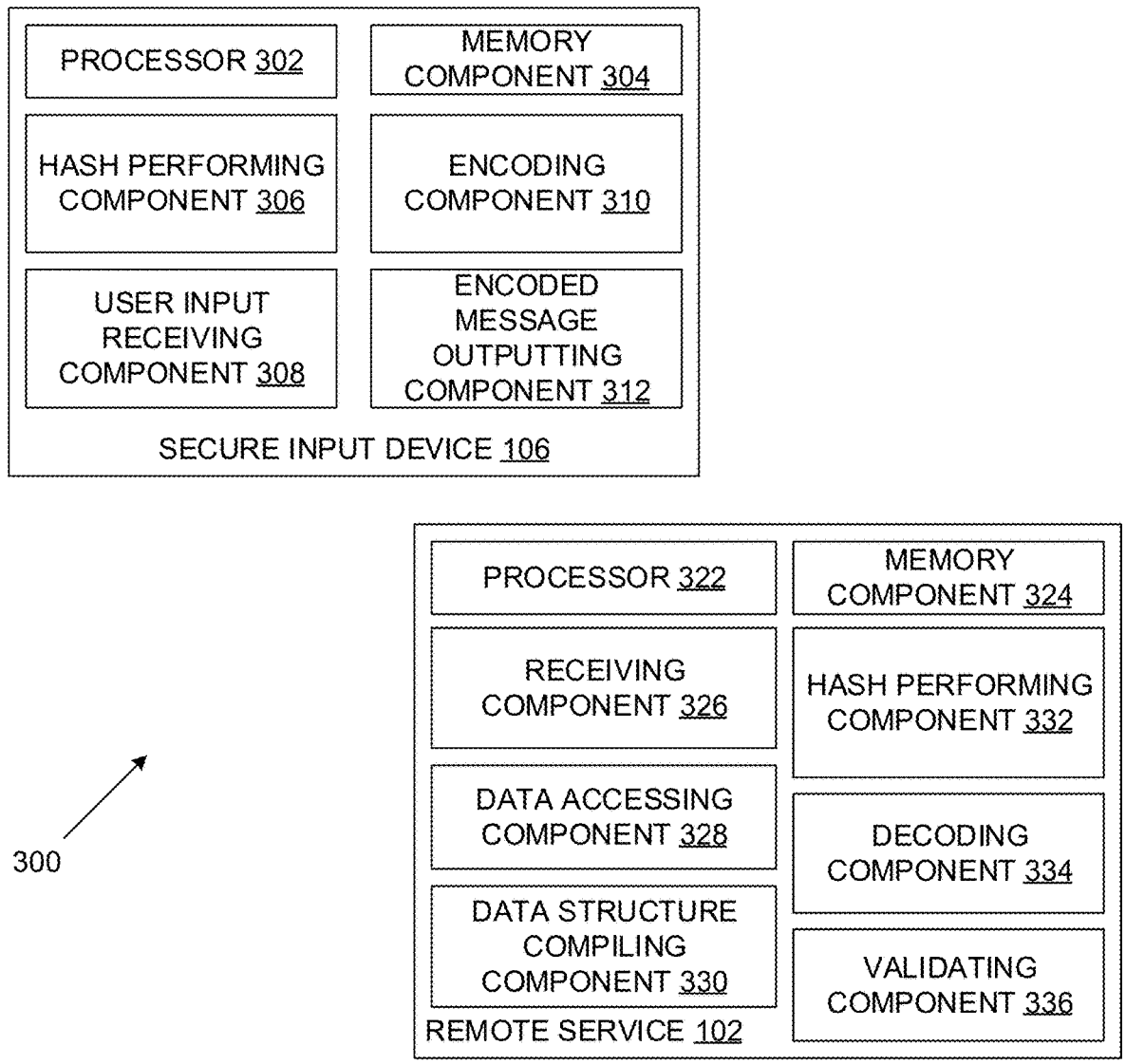
FIG. 3 is a block diagram which illustrates exemplary components which may be provided by a system for secure input at a remote service including remote service authentication according to aspects of the present disclosure; and, FIG. 4 illustrates an example of a computing device in which various aspects of the disclosure may be implemented.

Various components may be provided for implementing the method described above with reference to FIG. 2. FIG. 3 is a block diagram which illustrates exemplary components which may be provided by a system (300) for remote service authentication. The system (300) may include a secure input device (106) associated with a user (107) and a remote service (102).

The secure input device (106) may include a processor (302) for executing the functions of components described below, which may be provided by hardware or by software units executing on the secure input device (106). The software units may be stored in a memory component (304) and instructions may be provided to the processor (302) to carry out the functionality of the described components. Some or all of the components may be provided by a software application downloadable onto and executable on the secure input device (106).

The secure input device (106) may include a hash performing component (306) configured to perform a hash operation on a data structure including shared data. The shared data may include one or more of: an authentication prompt; authentication responses; a seed value (or cryptographic nonce); other plaintext data relating to the transaction, and the like. Performing the hash operation on the data structure may include compiling a data structure. The data structure may include one or more of the or a subset of the shared data; an authentication response input by the user; and, a unique, shared secret uniquely associated with the secure input device at the remote service. The hash operation may output a hash value or code representing a hash of the data structure which may be truncated to provide a data sequence of predefined length.

The secure input device (106) may include a user input receiving component (308) configured to receive an input from a user (107) for secure entry at the remote service. The input may represent a passcode which has previously been registered with the remote service (102).

The secure input device (106) may include an encoding component (310) configured to encode the received user input. The user input may be encoded by performing an operation on corresponding symbols of the user input and the output of the hash operation or a data sequence to output an encoded message. The user input, encoded message and data sequence (if any) may have the same length (i.e. the same number of symbols) and the operation may be performed symbol-wise on each symbol in the sequence of symbols. In some implementations the performed operation may implement a stream cipher-type operation in which the output of the hash operation or data sequence is used as a keystream. The encoding may thus be a stream cipher-based encoding of the user input in which the user input is passed through a stream cipher algorithm.

The secure input device (106) may include an encoded message outputting component (312) configured to output the encoded message. The encoded message may be output to the user as an OTP (i.e. it might be recognisable to the user as an OTP) for submission to the remote service.

The remote service (102) may include a processor (322) for executing the functions of components described below, which may be provided by hardware or by software units executing on a device associated with the remote service (102). The software units may be stored in a memory component (324) and instructions may be provided to the processor (322) to carry out the functionality of the described components.

The remote service (102) may include a receiving component (326) for receiving an encoded message. The encoded message may be received from a communication device via the secure session established between the communication device and the remote service. The encoded message may be associated with shared data.

The remote service (102) may include a data accessing component (328) for accessing the shared data. The data accessing component (328) may be configured to access shared data associated with the encoded message by means of a secure session between the remote service (102) and a communication device, such as the communication device from which the encoded message is received. The shared data may include one or more of: an authentication prompt; authentication responses; a seed value (or cryptographic nonce); other plaintext data relating to the transaction, and the like. The authentication prompt may include transaction details of a transaction to be authenticated.

The remote service (102) may include a data structure compiling component (330) for compiling a data structure associated with the secure input device. The data structure may include one or more of: the accessed shared data; an authentication response which is input by the user; and, a shared secret. The shared secret may be known only by the remote service and the secure input device. The shared secret may be uniquely associated with the secure input device at the remote service.

The remote service (102) may include a hash performing component (332) for performing a hash operation on the data structure. The hash operation may include outputting and truncating a hashed data structure so as to obtain a data sequence of a predefined length. In some implementations, the predefined length may be based on a length of a registered passcode.

The remote service (102) may include a decoding component (334) for decoding the encoded message. The encoded message may be decoded in order to obtain a user input representing a registered passcode. Decoding the encoded message may include performing an operation on corresponding symbols of the encoded message and the output of the hash operation or the data sequence to output user input. Performing the operation may include passing the encoded message through a stream cipher algorithm in which the output of the hash operation or the data sequence is used as a keystream so as to obtain the user input representing the registered passcode.

The remote service (102) may include a validating component (336) for validating the user input, which in some implementations includes validating that the user input represents the registered passcode associated with the user of the secure input device.

Systems and methods for secure input at a remote service are disclosed. The secure input may be from a secure input device, being a registered device, which is the only device that can decrypt shared data. The shared data is used to obtain consent and is used to create stream cipher. Information about a previously shared secret is used in creation of the stream cipher.

Figure 4:
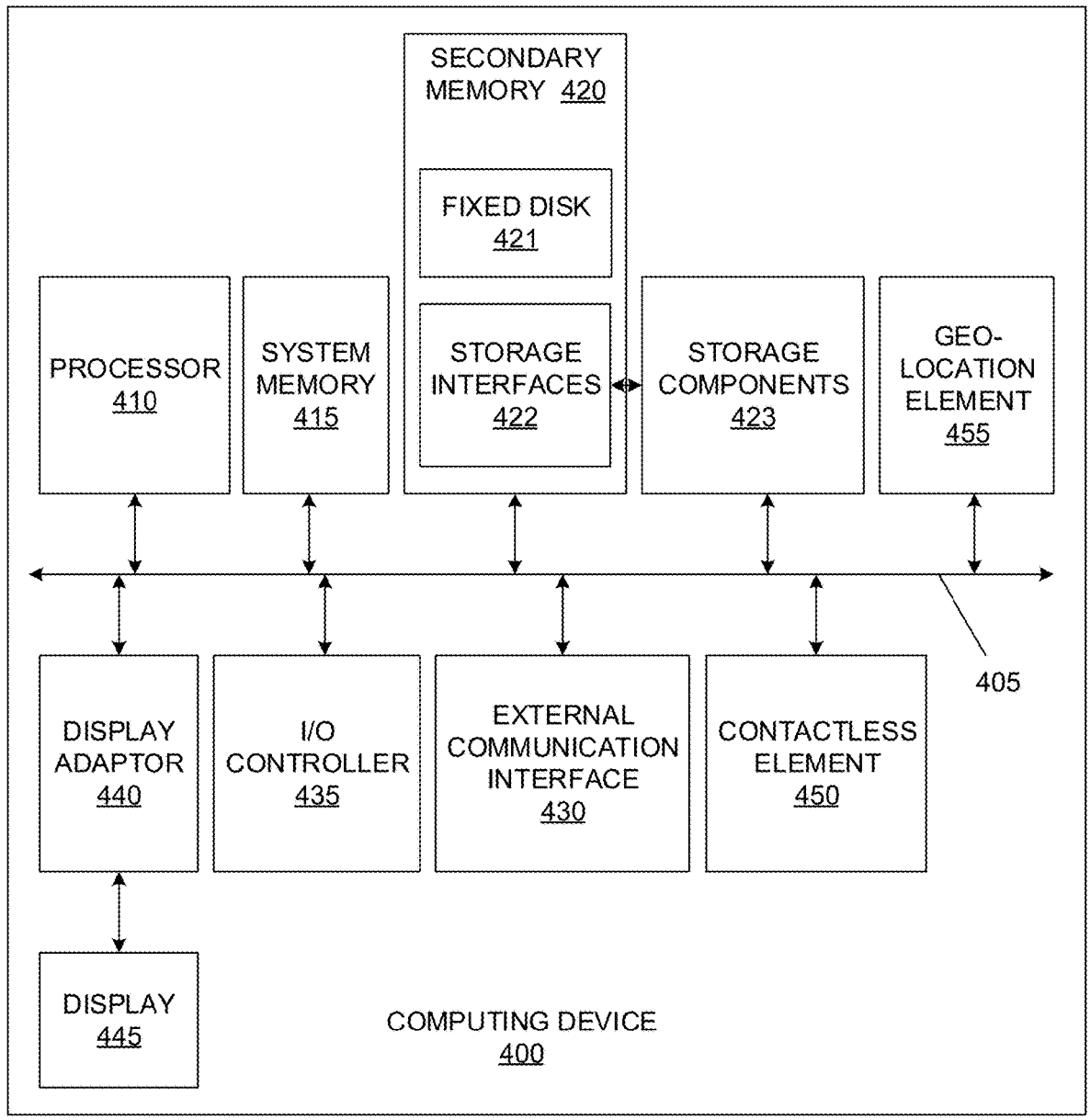

FIG. 4 illustrates an example of a computing device (400) in which various aspects of the disclosure may be implemented. The computing device (400) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (400) may be suitable for storing and executing computer program code. The various participants and elements in the previously described system diagrams may use any suitable number of subsystems or components of the computing device (400) to facilitate the functions described herein. The computing device (400) may include subsystems or components interconnected via a communication infrastructure (405) (for example, a communications bus, a network, etc.). The computing device (400) may include one or more processors (410) and at least one memory component in the form of computer-readable media. The one or more processors (410) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (400) may be distributed over a number of physical locations (e.g. in a distributed, cluster or cloud-based computing configuration) and appropriate software units may be arranged to manage and/or process data on behalf of remote devices.

The memory components may include system memory (415), which may include read only memory (ROM) and random access memory (RAM). A basic input/output system (BIOS) may be stored in ROM. System software may be stored in the system memory (415) including operating system software. The memory components may also include secondary memory (420). The secondary memory (420) may include a fixed disk (421), such as a hard disk drive, and, optionally, one or more storage interfaces (422) for interfacing with storage components (423), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (400) may include an external communications interface (430) for operation of the computing device (400) in a networked environment enabling transfer of data between multiple computing devices (400) and/or the Internet. Data transferred via the external communications interface (430) may be in the form of signals, which may be electronic, electromagnetic, optical, radio, or other types of signal. The external communications interface (430) may enable communication of data between the computing device (400) and other computing devices including servers and external storage facilities. Web services may be accessible by and/or from the computing device (400) via the communications interface (430).

The external communications interface (430) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry. The external communications interface (430) may include a subscriber identity module (SIM) in the form of an integrated circuit that stores an international mobile subscriber identity and the related key used to identify and authenticate a subscriber using the computing device (400). One or more subscriber identity modules may be removable from or embedded in the computing device (400).

The external communications interface (430) may further include a contactless element (450), which is typically implemented in the form of a semiconductor chip (or other data storage element) with an associated wireless transfer element, such as an antenna. The contactless element (450) may be associated with (e.g., embedded within) the computing device (400) and data or control instructions transmitted via a cellular network may be applied to the contactless element (450) by means of a contactless element interface (not shown). The contactless element interface may function to permit the exchange of data and/or control instructions between computing device circuitry (and hence the cellular network) and the contactless element (450). The contactless element (450) may be capable of transferring and receiving data using a near field communications capability (or near field communications medium) typically in accordance with a standardized protocol or data transfer mechanism (e.g., ISO 14443/NFC). Near field communications capability may include a short-range communications capability, such as radio-frequency identification (RFID), Bluetooth™, infra-red, or other data transfer capability that can be used to exchange data between the computing device (400) and an interrogation device. Thus, the computing device (400) may be capable of communicating and transferring data and/or control instructions via both a cellular network and near field communications capability.

The computer-readable media in the form of the various memory components may provide storage of computer-executable instructions, data structures, program modules, software units and other data. A computer program product may be provided by a computer-readable medium having stored computer-readable program code executable by the central processor (410). A computer program product may be provided by a non-transient computer-readable medium, or may be provided via a signal or other transient means via the communications interface (430).

Interconnection via the communication infrastructure (405) allows the one or more processors (410) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (400) either directly or via an I/O controller (435). One or more displays (445) (which may be touch-sensitive displays) may be coupled to or integrally formed with the computing device (400) via a display (445) or video adapter (440).

The computing device (400) may include a geographical location element (455) which is arranged to determine the geographical location of the computing device (400). The geographical location element (455) may for example be implemented by way of a global positioning system (GPS), or similar, receiver module. In some implementations the geographical location element (455) may implement an indoor positioning system, using for example communication channels such as cellular telephone or Wi-Fi™ networks and/or beacons (e.g. Bluetooth™ Low Energy (BLE) beacons, iBeacons™, etc.) to determine or approximate the geographical location of the computing device (400). In some implementations, the geographical location element (455) may implement inertial navigation to track and determine the geographical location of the communication device using an initial set point and inertial measurement data.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™' C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A computer-implemented method conducted at a secure input device comprising:
performing a hash operation on a data structure including shared data, the shared data having been obtained from a remote service via an encrypted payload;
receiving user input for secure entry at the remote service;
encoding the user input by performing an operation on corresponding symbols of the user input and an output of the hash operation to output an encoded message, wherein the user input and the encoded message have the same length; and,
outputting the encoded message for entry at the remote service.

2. The method as claimed in claim 1, wherein the user input represents a passcode to be set at the remote service.

3. The method as claimed in claim 1, wherein the user input represents a registered passcode for validation by the remote service.

4. The method as claimed in claim 1, wherein outputting the encoded message includes outputting the encoded message for entry at the remote service via a communication device.

5. The method as claimed in claim 1, wherein outputting the encoded message includes outputting the encoded message as a one-time password (OTP) for input into and transmission from a communication device to the remote service.

6. The method as claimed in claim 1, including truncating the output of the hash operation to obtain a data sequence of predefined length, the data sequence being based on the shared data, and wherein encoding the user input includes performing an operation on corresponding symbols of the user input and the data sequence to output the encoded message, and wherein the user input and the data sequence have the same length.

7. The method as claimed in claim 1, including:
obtaining the shared data from the remote service, including decrypting the encrypted payload received from the remote service using a decryption key.

8. The method as claimed in claim 7, wherein the decryption key is a private key securely stored in the secure input device and which corresponds to a public key accessible to the remote service.

9. The method as claimed in claim 8, wherein the private key is associated with a biometric certificate and is stored in a secure storage location from where it is accessible only upon presentation of an associated biometric credential, and wherein the biometric certificate is uniquely associated with the secure input device.

10. The method as claimed in claim 7, wherein obtaining the shared data from the remote service includes capturing the encrypted payload being output by the remote service via a communication device, wherein the encrypted payload is captured by optically capturing a graphical code representing the encrypted payload and being displayed via the communication device.

11. The method as claimed in claim 1, wherein encoding the user input includes passing the user input through a stream cipher algorithm so as to output an encoded message, wherein the output of the hash operation or a data sequence is used as a keystream in the stream cipher algorithm.

12. The method as claimed in claim 1, wherein the shared data includes a nonce for submission to the remote service.

13. The method as claimed in claim 1, wherein the data structure includes a unique shared secret only known by the remote service and the secure input device.

14. A computer-implemented method conducted at a remote service comprising:
receiving an encoded message having been output by a secure input device, the encoded message including user input for secure entry at the remote service and being associated with shared data having been provided to the secure input device via an encrypted payload;
performing a hash operation on a data structure including the shared data;
decoding the encoded message to obtain the user input by performing an operation on corresponding symbols of the encoded message and an output of the hash operation to output the user input; and,
validating the user input.

15. The method as claimed in claim 14, including truncating an output of the hash operation to obtain a data sequence of predefined length, the data sequence being based on the shared data, wherein performing the operation includes performing the operation on corresponding symbols of the encoded message and the data sequence to output the user input.

16. The method as claimed in claim 14, wherein the user input represents a registered passcode, and wherein validating the user input includes validating whether the user input represents the registered passcode.

17. The method as claimed in claim 14, wherein performing the operation includes passing the encoded message through a stream cipher algorithm, wherein the output of the hash operation or a data sequence is used as a keystream in the stream cipher algorithm.

18. The method as claimed in claim 14, wherein the data structure includes a unique shared secret only known by the remote service and the secure input device.

19. A system including a secure input device including memory for storing computer-readable program code and a processor for executing the computer-readable program code, the secure input device comprising:
a first hash performing component arranged to perform a hash operation on a data structure including shared data, the shared data having been obtained from a remote service via an encrypted payload;
a user input receiving component arranged to receive user input for secure entry at the remote service;
an encoding component arranged to encode the user input by performing an operation on corresponding symbols of the user input and an output of the hash operation to output an encoded message, wherein the user input and the encoded message have the same length; and,
an encoded message outputting component arranged to output the encoded message for entry at the remote service.

20. The system as claimed in claim 19, including the remote service, the remote service having memory for storing computer-readable program code and a processor for executing the computer-readable program code, the remote service comprising:
a receiving component arranged to receive the encoded message having been output by the secure input device, the encoded message including user input for secure entry at the remote service and being associated with the shared data having been provided to the secure input device via an encrypted payload;

a second hash performing component arranged to perform a hash operation on a data structure including the shared data;

a decoding component arranged to decode the encoded message to obtain the user input by performing an operation on corresponding symbols of the encoded message and an output of the hash operation to output the user input; and, a validating component arranged to validate the user input.

* * * * *